US012770514B2

(12) United States Patent
Hsieh

(10) Patent No.: US 12,770,514 B2
(45) Date of Patent: Oct. 20, 2026

(54) FORWARD COLLISION WARNING METHOD, AND COMPUTER SYSTEM FOR FORWARD COLLISION WARNING

(71) Applicant: MiTAC Digital Technology Corporation, Taoyuan City (TW)

(72) Inventor: Hsiang-Yu Hsieh, Taoyuan City (TW)

(73) Assignee: MITAC DIGITAL TECHNOLOGY CORPORATION, Taoyuan City (TW)

( * ) Notice: Subject to any disclaimer, the term of this patent is extended or adjusted under 35 U.S.C. 154(b) by 22 days.

(21) Appl. No.: 19/179,616

(22) Filed: Apr. 15, 2025

(65) Prior Publication Data

US 2026/0162535 A1 Jun. 11, 2026

(30) Foreign Application Priority Data

Apr. 17, 2024 (TW) ................................ 113114272

(51) Int. Cl.

*G08G 1/16* (2006.01)
*G06V 10/762* (2022.01)
*G06V 10/774* (2022.01)
*G06V 20/56* (2022.01)
*G06V 20/59* (2022.01)
*G06V 40/16* (2022.01)

(52) U.S. Cl.

CPC ............. *G08G 1/16* (2013.01); *G06V 10/762* (2022.01); *G06V 10/774* (2022.01); *G06V 20/588* (2022.01); *G06V 20/59* (2022.01); *G06V 40/178* (2022.01)

(58) Field of Classification Search

None

See application file for complete search history.

(56) References Cited

U.S. PATENT DOCUMENTS 10,460,534 B1 * 10/2019 Brandmaier ........... G07C 5/008
2007/0213883 A1 * 9/2007 Clarke ................... G07C 5/085 701/1
2021/0049908 A1 * 2/2021 Pipe ..................... G08G 1/0112

* cited by examiner

*Primary Examiner* — Thomas S McCormack

(74) *Attorney, Agent, or Firm* — Panitch Schwarze Belsiario & Nadel LLP

(57) ABSTRACT

A forward collision warning method is provided for use by a vehicle. A current front-view image and a current in-cabin image are used to identify a current road surface condition and to estimate an age of a driver of the vehicle. The identified current road surface condition and the estimated age are used to estimate a friction coefficient and a reaction time of the driver, and a risk evaluation model is used to evaluate a current risk level based on the estimated friction coefficient and the estimated reaction time. Then, a current collision time threshold is retrieved from a threshold lookup table and provided to a forward collision warning system (FCWS) of the vehicle, making the FCWS to perceivably issue a collision waring when a predicted collision time is smaller than the current collision time threshold.

11 Claims, 6 Drawing Sheets

FORWARD COLLISION WARNING METHOD, AND COMPUTER SYSTEM FOR FORWARD COLLISION WARNING

CROSS-REFERENCE TO RELATED APPLICATION

This application claims priority to Taiwanese Invention patent application No. 113114272, filed on Apr. 17, 2024, the entire disclosure of which is incorporated by reference herein.

FIELD

The disclosure relates to forward collision warning, and more particularly to a method and a system for dynamically setting a collision time threshold for use by a forward collision warning system.

BACKGROUND

Forward collision warning systems (FCWS) have become a standard feature in newly produced vehicles. The primary function of a forward collision warning system is to remind the driver of maintaining a safe following distance (sufficient for stopping the vehicle). In operation, a conventional forward collision warning system estimates a distance to a vehicle ahead using front-facing images or radar, and calculates the time-to-collision (TTC) based on a current speed and the estimated distance. The calculated TTC is then compared with a fixed reference time threshold related to collision warnings, in order to determine whether to issue an alert. For example, if the calculated TTC is greater than the fixed reference time threshold, the conventional forward collision warning system may determine not to issue a collision warning; if the calculated TTC is smaller than or equal to the fixed reference time threshold, the conventional forward collision warning system may determine to issue a collision warning.

However, using the fixed reference time threshold as the sole criterion for issuing the collision warning may be ineffective for drivers with varying driving capabilities (such as braking reaction times) or under different driving conditions (such as weather or road conditions). For example, in clear weather and on well-maintained roads, particularly for drivers with better driving capabilities (e.g., having braking reaction times shorter than the fixed reference threshold), they may perceive that they have sufficient time to avoid a collision with the vehicle ahead and therefore ignore the warning. Such a collision warning would be regarded as an unnecessary and intrusive alert. Conversely, in rainy or snowy weather conditions where roads are muddy and slippery, especially for drivers with poorer driving capabilities (e.g., having braking reaction times longer than the fixed reference threshold), even if they respond immediately to the warning and brake, they may still be unable to stop in time to avoid a collision. In such cases, the warning would be deemed too late and thus ineffective as well.

SUMMARY

Therefore, an object of the disclosure is to provide a forward collision warning method and a computer system adapted for use with a forward collision warning system of a vehicle to perform forward collision warning, so as to accommodate drivers with varying driving capabilities (such as braking proficiency) as well as uncontrollable road conditions.

According to the disclosure, the forward collision warning method is provided for use by a vehicle that has a computer system, a forward collision warning system, a front-facing camera module and an in-cabin camera module. The method is implemented by the computer system, and includes steps of: (A) upon obtaining a current front-view image and a current in-cabin image respectively from the front-facing camera module and the in-cabin camera module while the vehicle is travelling, using a road surface condition recognition model that is pre-established in the computer system to identify a current road surface condition based on the current front-view image, and using an age estimation model that is pre-established in the computer system to obtain an estimated age of a driver of the vehicle based on the current in-cabin image; (B) using a risk level evaluation model to determine a current risk level based on a current friction coefficient and a current reaction time, wherein the current friction coefficient is estimated using a friction coefficient estimation model based on the current road surface condition, and the current reaction time is estimated using a reaction time estimation model based on the estimated age of the driver; and (C) retrieving a current collision time threshold from a threshold lookup table that is pre-established to record a plurality of different collision time threshold values respectively corresponding to a plurality of risk levels, and providing the current collision time threshold to the forward collision warning system to perceivably issue a collision waring in response to a predicted collision time being smaller than the current collision time threshold.

According to the disclosure, the computer system is provided for use with a forward collision warning system of a vehicle to perform forward collision warning. The vehicle has a front-facing camera module and an in-cabin camera module, and includes a storage module, a receiver module and a processor. The storage module stores an age estimation model, a road surface condition recognition model, a reaction time estimation model with age as a feature parameter, a friction coefficient estimation model with a road surface condition as a feature parameter, a threshold lookup table recording a plurality of different collision time threshold values that respectively correspond to a plurality of risk levels, and a risk level evaluation model with a friction coefficient and a reaction time as feature parameters. The receiver module is configured to receive a current front-view image and a current in-cabin image respectively from the front-facing camera module and the in-cabin camera module. The processor is electrically connected to and cooperating with the storage module and the receiver module to configure the computer system to perform the method of this disclosure.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
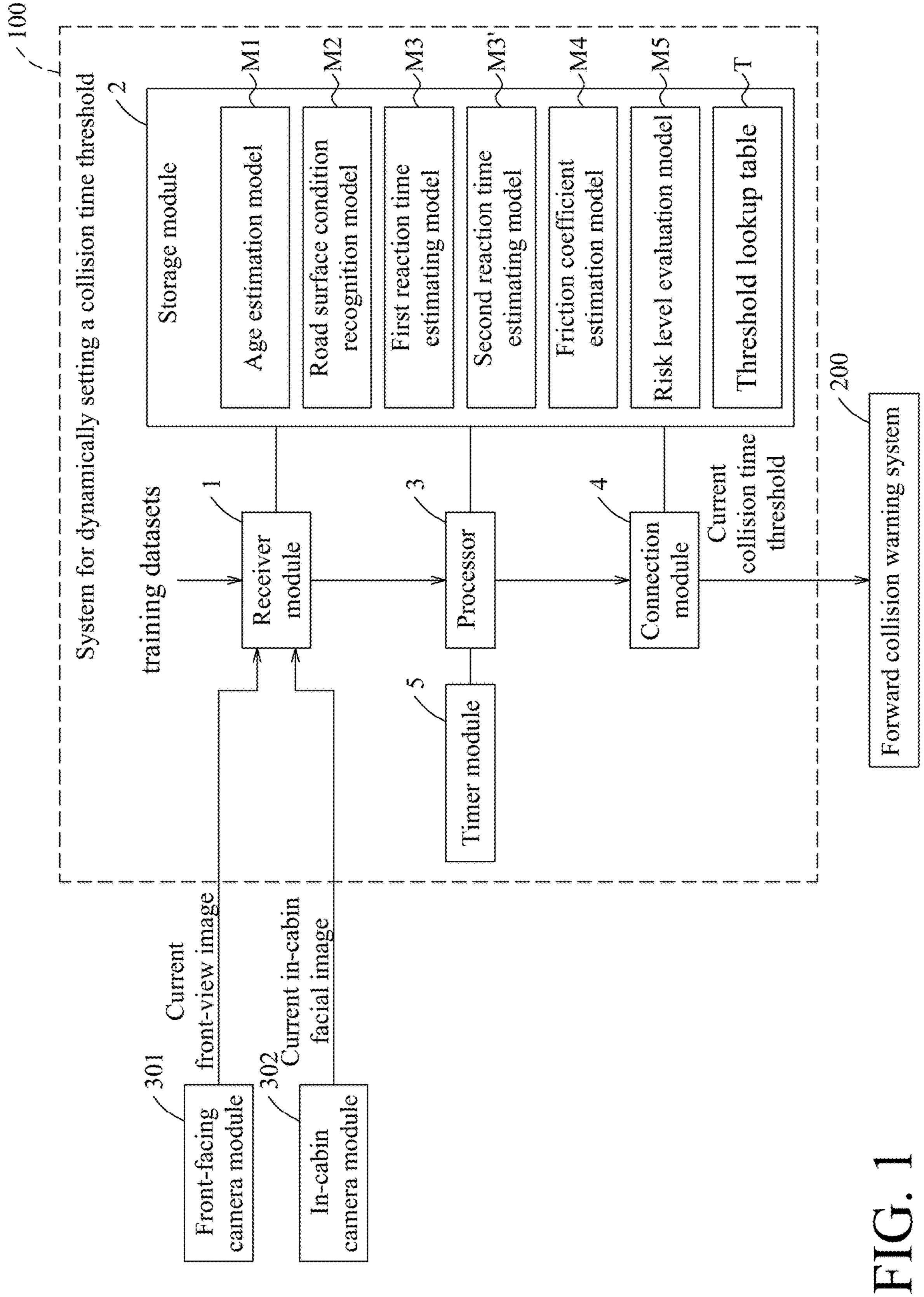
FIG. 1 is a block diagram illustrating an example of a system that implements an embodiment of a method for dynamically setting a collision time threshold according to the disclosure, where the collision time threshold is for use by a forward collision warning system of a vehicle to perform forward collision warning.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of a system 100 for dynamically setting a collision time threshold for use by a forward collision warning system 200 of a vehicle (not shown) is provided according to the disclosure, allowing the forward collision warning system 200 to dynamically calculate a braking safety distance that better aligns with a current actual condition (e.g., including at least the driver's braking reaction time and the road surface condition) based on the dynamically set collision time threshold, so as to issue collision warnings more appropriately. The forward collusion warning system 200 is installed in the vehicle equipped with a front-facing camera module 301 and an in-cabin camera module 302. The front-facing camera module 301 is configured to continuously capture images of an external environment in front of the vehicle (referred to as front-view images hereinafter). The in-cabin camera module 302 is configured to continuously capture images of an interior environment of the vehicle, particularly including facial images of a driver of the vehicle (referred to as in-cabin facial images hereinafter). In some embodiments, the system 100 may be realized using a computer system, and includes a receiver module 1, a storage module 2, a processor 3 electrically connected to the receiver module 1 and the storage module 2, and a connection module 4 electrically connected to the processor 3 and the forward collision warning system 200. In some embodiments, the processor 3 may be realized using, for example, a central processing unit (CPU), a microprocessor, a micro controller, etc., and this disclosure is not limited in this respect. In some embodiments, the receiver module 1 and the connection module 4 may be realized using, for example, a vehicle bus, such as a controller area network (CAN) bus, other suitable communication networks, or any combination thereof.

The receiver module 1 is electrically connected to the front-facing camera module 301 for receiving a current front-view image captured by the front-facing camera module 301, is electrically connected to the in-cabin camera module 302 for receiving a current in-cabin facial image captured by the in-cabin camera module 302, and is adapted to receive a plurality of training datasets related to vehicle travel for model training. In some embodiments, the training datasets may be collected and provided by an external server (not shown) that is connected to the receiver module 1, but this disclosure is not limited in this respect. In this embodiment, each of the training datasets includes a training front-view image and a training in-cabin facial image that correspond to the same time point (e.g., the training front-view image and the training in-cabin facial image captured simultaneously).

The storage module 2 stores an age estimation model M1, a road surface condition recognition model M2, a first reaction time estimating model M3, a second reaction time estimating model M3', a friction coefficient estimation model M4, and a threshold lookup table (T). In some embodiments, the storage module 2 may be realized using a non-volatile storage medium, such as a flash memory module, hard disk drive, solid state drive, etc. The age estimation model M1 is pre-built to obtain an estimated age of a person within a predetermined range of age based on a facial image. The road surface condition recognition model M2 is pre-built to identify a road surface condition based on an image of a road surface. The first reaction time estimating model M3 and the second reaction time estimating model M3' use age as a feature parameter to estimate a reaction time for a person. The friction coefficient estimation model M4 uses a road surface condition as a feature parameter to estimate a friction coefficient for a road.

In this embodiment, the age estimation model M1 is built using, for example, a convolutional neural network (CNN) model, and is developed by processing, analyzing, and computing a large amount of facial image data related to the predetermined range of age (e.g., 20 years old to 80 years old) for model training. The CNN model includes computations such as convolutional layers (e.g., a residual neural network, ResNet), activation functions (e.g., ReLU), a fully connected layer, softmax functions, maximum likelihood nonlinear regression, etc. Additionally, in a training process of the age estimation model M1, the final output (e.g., an estimated age within the range of 20 years old to 80 years old) is compared with the actual label (ground truth), and the loss (e.g., entropy loss) is calculated and fed back to the fully connected layers to update the network parameters, thereby improving the accuracy and performance of the age estimation model M1.

In this embodiment, the road surface condition recognition model M2 is also a CNN model, and is developed by processing, analyzing, and computing a large volume of road surface image data related to various road conditions (e.g., dry asphalt road, wet asphalt road, dry concrete road, wet concrete road, gravel road, snowy road) for model training. The model architecture is similar to that of the age estimation model M1, so details thereof are omitted herein for the sake of brevity. In some embodiments, the output of the road surface condition recognition model M2 is an index representing an identified road surface condition. For example, the index for a dry asphalt road could be "1"; the index for a wet asphalt road could be "2"; the index for a dry concrete road could be "3"; the index for a wet concrete road could be "4'"; the index for a gravel road could be "7"; and the index for a snowy road could be "9".

In this embodiment, the first reaction time estimating model M3 is a nonlinear feature regression model built through polynomial fitting, using age as a feature parameter and based on a large amount of reaction time data related to braking responses of drivers within the predetermined range of age (e.g., 20 years old to 80 years old). Referring to FIG.

3, a nonlinear function F1($x$) (represented by a black curve) of the first reaction time estimating model M3, obtained from a large set of age-related reaction time data (represented by black dots), can, for example, be expressed by the following equation:

$$F1(x) = Ax^4 + Bx^3 + Cx^2 + Dx + E, \quad (1)$$

where A=0.000000165, B=−0.000035474, C=0.00278231, D=−0.084237301, and E=1.559411814.

In this embodiment, the second reaction time estimating model M3' is a non-linear function built through polynomial fitting, using age as a feature parameter and based on a large amount of reaction time data related to braking responses of drivers within the predetermined range of age (e.g., 20 years old to 80 years old) during extended periods of continuous driving.

When a driver is in a state of prolonged continuous driving and keeps focusing on the lane and monitoring surrounding road conditions, physical and visual fatigue can increase the time required to initiate a braking response. According to statistical data, the average reaction time for braking doubles after 4 to 5 hours of continuous driving compared to the initial reaction time at the start of driving. If the driving duration extends to 7 to 8 hours, the reaction time can increase by up to three times the initial reaction time, significantly affecting the calculated collision time threshold. In light of this, the second reaction time estimating model M3' is introduced to reflect the changes in reaction time trends for typical drivers during extended periods of continuous driving.

Figure 4:
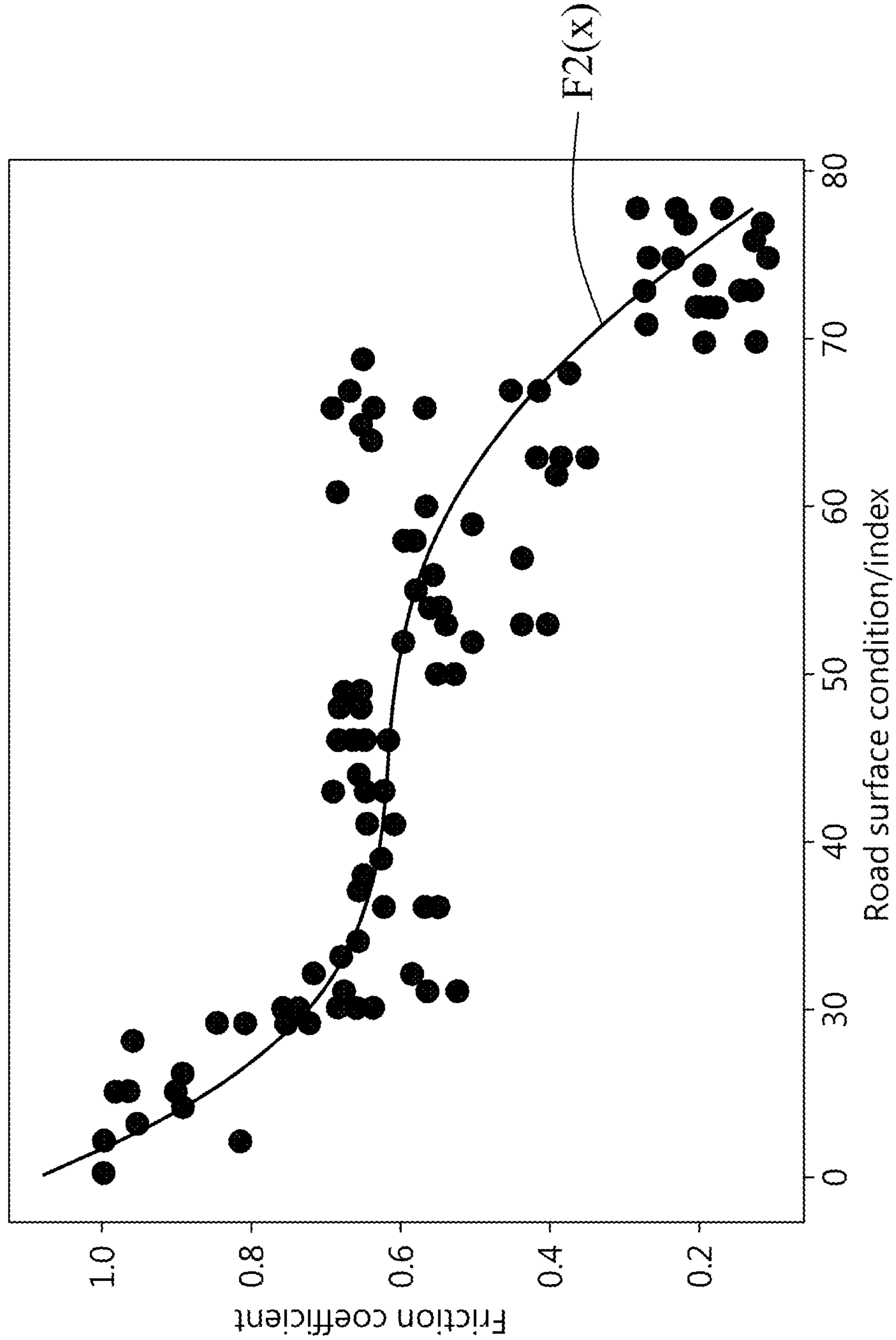
FIG. 4 is a plot exemplarily illustrating a nonlinear function F2(x) that represents a friction coefficient estimation model obtained based on extensive friction coefficient data from six different road surface conditions according to this disclosure.

In this embodiment, the friction coefficient estimation model M4 is a nonlinear feature regression model established through polynomial fitting, using the road condition as a feature parameter and based on extensive friction coefficient data related to frictions between various road conditions and vehicle wheels. Referring to FIG. 4, a non-linear function F2 ($x$) (represented by a black curve) that represents the friction coefficient estimation model M4 is shown to be derived from extensive friction coefficient data (represented by black dots) associated with road conditions. For example, the nonlinear function F2 ($x$) can be expressed by the following equation:

$$F2\ (x) = ax^4 + bx^3 + cx^2 + dx + e, \quad (2)$$

where a=0.000000258, b=−0.000046192, c=0.002498152, d=−0.05613287, and e=1.076333765. It is noted that the indices of the road surface conditions may be defined differently as needed. For example, the indices range from 0 to 80 in FIG. 4, which is different from the aforesaid example.

The threshold lookup table (T) is pre-established to record a plurality of different collision time threshold values respectively corresponding to a plurality of risk levels. For example, Table 1 exemplifies the threshold lookup table (T) that records six different collision time threshold values respectively corresponding to six risk levels, where the collision time threshold values range from 0.5 seconds to 2 seconds.

TABLE 1

| Risk level | Collision time threshold value |
|---|---|
| Risk level 1 | 2 |
| Risk level 2 | 1.7 |
| Risk level 3 | 1.4 |
| Risk level 4 | 1.1 |
| Risk level 5 | 0.8 |
| Risk level 6 | 0.5 |

Figure 2:
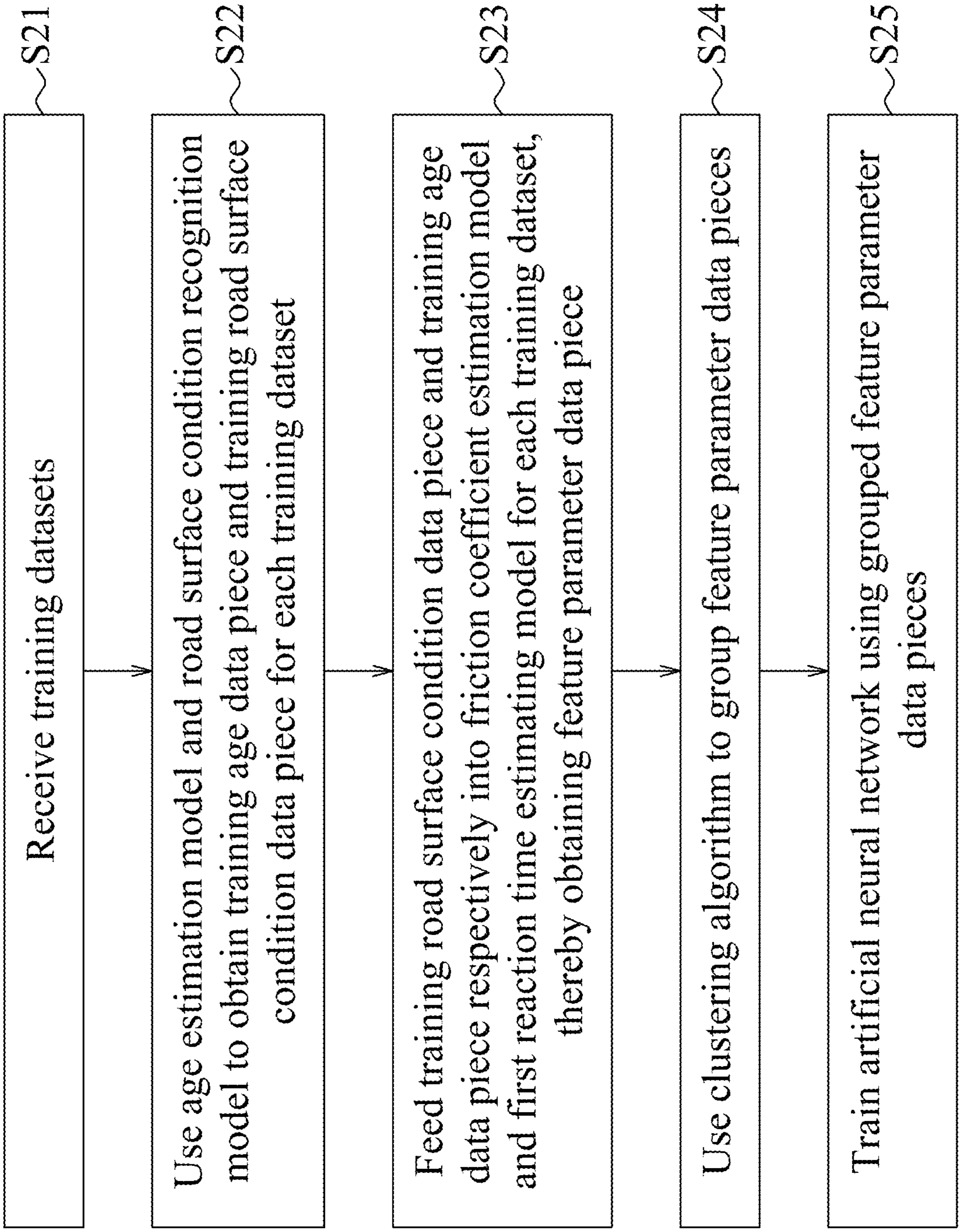
FIG. 2 is a flow chart illustrating an example for building a risk level evaluation model according to this disclosure.
Figure 3:
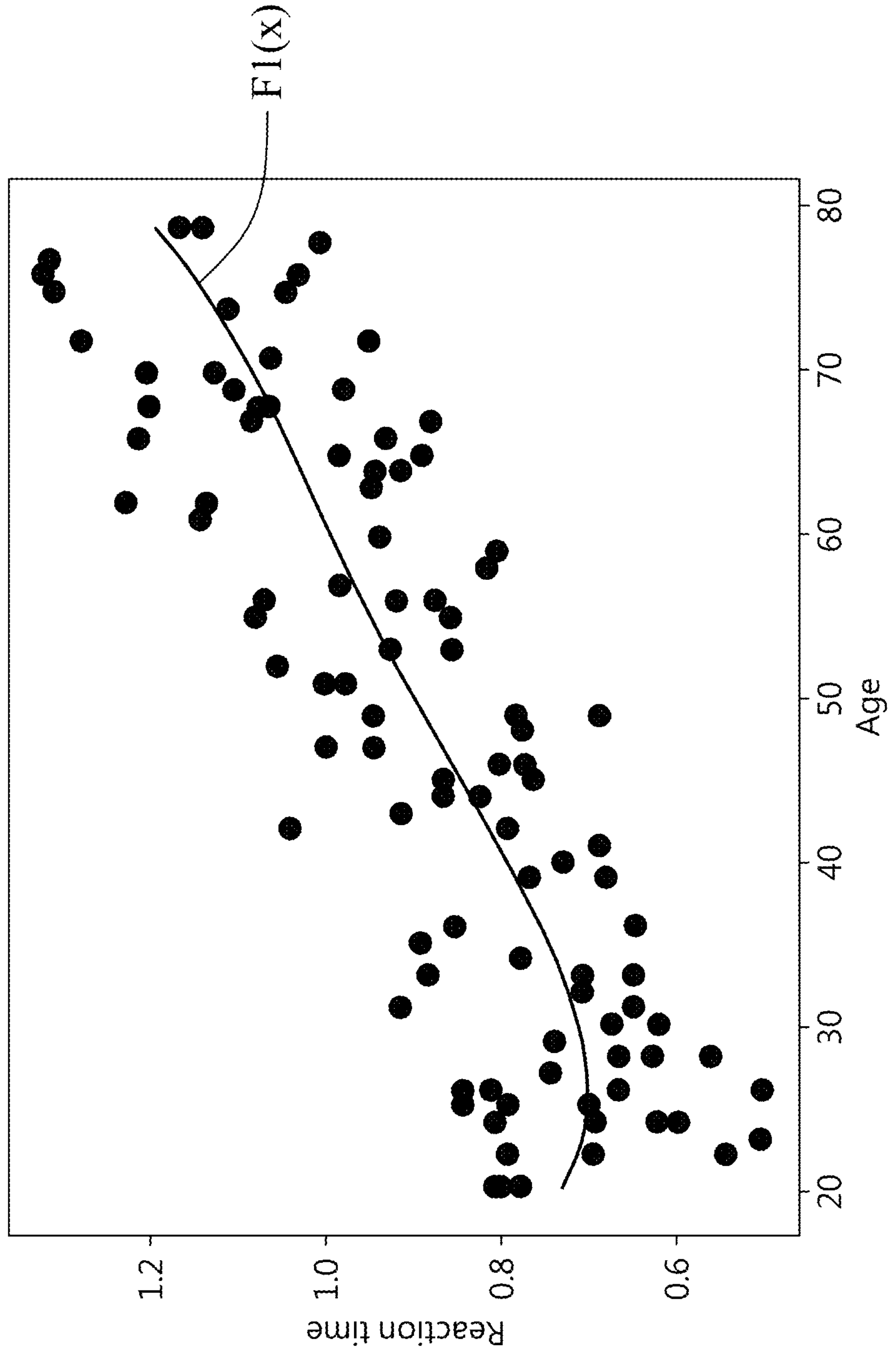
FIG. 3 is a plot exemplarily illustrating a nonlinear function F1(x) that represents a first reaction time estimating model obtained based on extensive reaction time data from drivers aged from 20 to 80 according to this disclosure.

In practice, the processor 3 may perform a modeling procedure to build a risk level evaluation model M5, which uses a friction coefficient and a reaction time as feature parameters and is associated with the risk levels, before execution of the method for dynamically setting a collision time threshold. Referring to FIGS. 1 and 2, an embodiment of a method for building the risk level evaluation model M5 is shown to include steps S21 to S25.

In step S21, the processor 3 receives the training datasets through the receiver module 1.

In step S22, for each of the training datasets, the processor 3 uses the age estimation model M1 to obtain a training age data piece that indicates an estimated age based on the training in-cabin facial image of the training dataset, and uses the road surface condition recognition model M2 to obtain a training road surface condition data piece that indicates a road surface condition based on the training front-view image of the training dataset.

Figure 5:
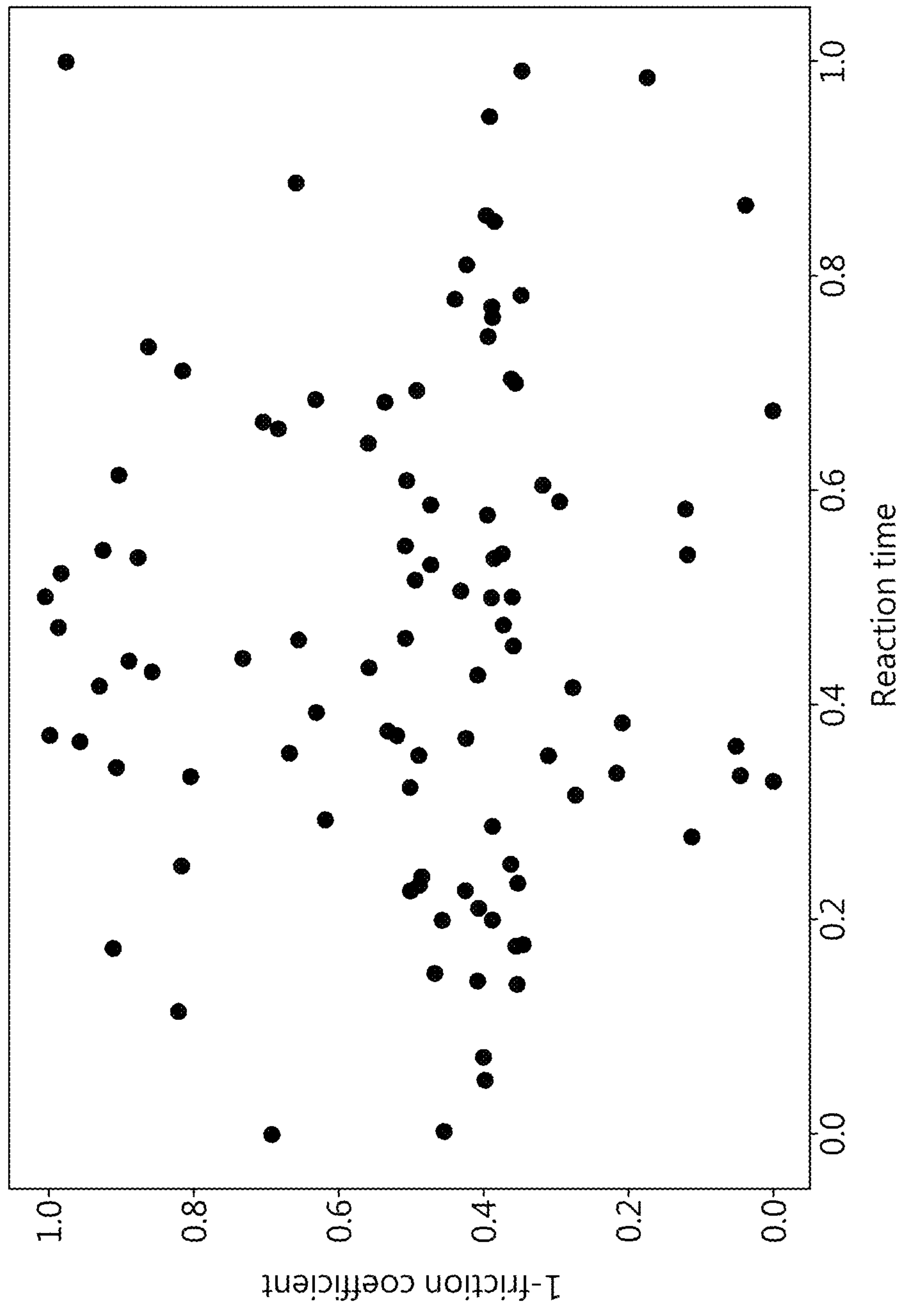
FIG. 5 is a plot obtained based on multiple driving data records, and exemplarily illustrating a distribution of multiple data points in a two-dimensional coordinate system with the reaction time on its x-axis and the friction coefficient on its y-axis according to this disclosure.

In step S23, for each of the training datasets, the processor 3 feeds the training road surface condition data piece and the training age data piece obtained in step S22 respectively into the friction coefficient estimation model M4 and the first reaction time estimating model M3, thereby obtaining a feature parameter data piece that corresponds to the training dataset, and that includes a training friction coefficient and a training reaction time. As a result, the processor 3 obtains multiple feature parameter data pieces that respectively correspond to the training datasets. FIG. 5 exemplarily shows an example where each of the feature parameter data pieces is represented as a black dot in a two-dimensional coordinate system that has a horizontal axis representing the reaction time, and a vertical axis representing a difference between 1 and the friction coefficient (namely, 1 minus the friction coefficient). This transformation allows feature parameter values corresponding to a road condition with the lowest risk level; for example, when the friction coefficient is 1, it is to be converted to the minimum value of 0 (i.e., 1−1=0).

Figure 6:
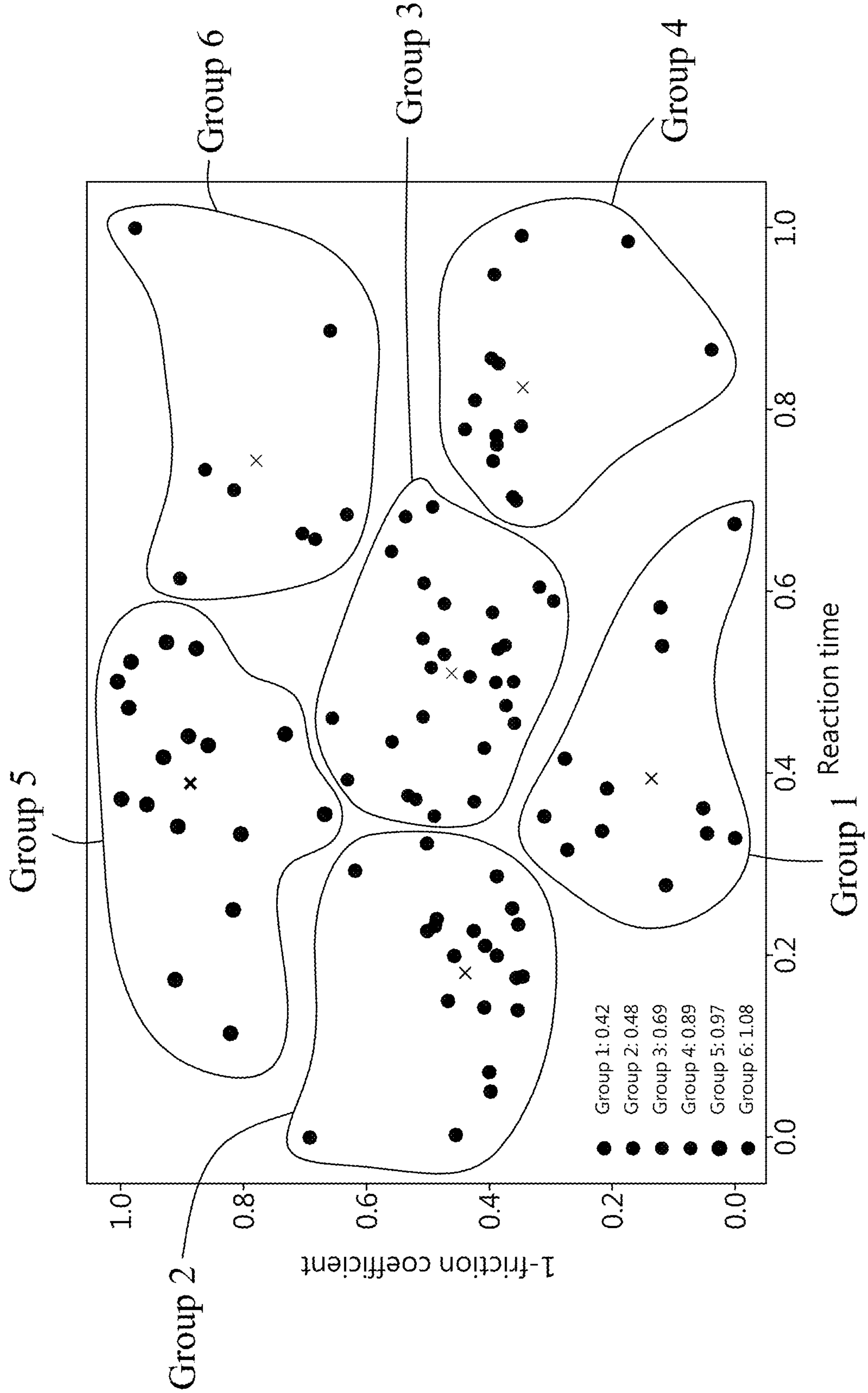
FIG. 6 exemplarily illustrates a distribution of six feature parameter groups in the two-dimensional coordinate system, obtained by grouping the data points.

In step S24, the processor 3 uses a clustering algorithm to group the feature parameter data pieces, thereby obtaining multiple groups of the feature parameter data pieces that respectively correspond to the risk levels. In this embodiment, the clustering algorithm may use, for example, the K-means algorithm, the density-based spatial clustering of applications with noise (DBSCAN), etc., and this disclosure is not limited in this respect. For instance, based on the feature parameter data pieces shown in FIG. 5 and assuming a total number of the risk levels is six, the processor 3 may obtain a clustering result as shown in FIG. 6, which consists of six groups of the feature parameter data pieces (Group 1 to Group 6). Additionally, as shown in FIG. 6, the processor 3 calculates the Euclidean distance between a center of each group (indicated by a symbol "x") and an origin of the two-dimensional coordinate system, which represents the lowest risk level. The Euclidean distances for the groups are then ranked to define the risk levels corresponding to the six groups, as shown in Table 2. In other words, the smaller the Euclidean distance associated with a group, the lower its corresponding risk level (i.e., less risky).

TABLE 2

| Group of feature parameter data pieces | Euclidean distance | Risk level |
|---|---|---|
| Group 1 | 0.42 | Risk level 6 |
| Group 2 | 0.48 | Risk level 5 |
| Group 3 | 0.69 | Risk level 4 |
| Group 4 | 0.89 | Risk level 3 |
| Group 5 | 0.97 | Risk level 2 |
| Group 6 | 1.08 | Risk level 1 |

In step S25, the processor 3 trains an artificial neural network using the feature parameter data pieces that have been grouped, thereby obtaining the risk level evaluation model M5 that uses the friction coefficient and the reaction time as feature parameters and that is associated with the risk levels. Then, the processor 3 stores the risk level evaluation model M5 into the storage module 2. Since the processor 3 has already grouped the feature parameter data pieces used to train the risk level evaluation model M5 and determined the risk level associated with each data point, ground truths can be accurately provided during the training phase. In this embodiment, the risk level evaluation model M5 may be, for example, a multilayer perceptron (MLP) model, which may consist of an input layer, at least one hidden layer, and an output layer. The input layer is used to receive feature values (e.g., the reaction time and the friction coefficient) of each feature parameter data piece. Each hidden layer may include multiple neurons, with each neuron receiving outputs from a previous layer, applying weight adjustments, and performing activation function computations (e.g., ReLU). The output layer processes the outputs from a previous (hidden) layer by applying weight adjustments and a Softmax function to produce an evaluated risk level. In some embodiments, the artificial neural network trains its parameters using gradient descent optimization. When errors between evaluation results and the ground truths converge, the optimal model parameters are obtained, marking the completion of the training process. Experimentally, for a dataset of 100 feature parameter pieces, the risk level evaluation model M5 typically reaches near saturation after about 30 training iterations, achieving an accuracy of up to 98% in terms of risk level evaluation. At this point, the modeling process is completed.

During operation (i.e., while the vehicle is in motion), when the processor 3 receives a current front-view image and a current in-cabin image simultaneously captured by the front-facing camera module 301 and the in-cabin camera module 302, the processer 3 utilizes the age estimation model M1 and the road surface condition recognition model M2 that are stored in the storage module 2 to obtain an estimate age of the driver of the vehicle and to identify a current road condition of the road where the vehicle is travelling. Then, the processor 3 determines whether a position of a road object (e.g., a lane segment) in the current front-view image has shifted compared to its position in the previous front-view image, and triggers a timer module 5 based on a determination thus made. The first time the processor 3 detects a positional change of the road object during the current trip of the vehicle (i.e., the vehicle starts moving), the processor 3 activates the timer module 5 to start timing, so as to generate a current timing duration, which is then returned to the processor 3, but this disclosure is not limited in this respect. In some embodiments, when the front-facing camera module 301 begins capturing images, it first collects a specific number of the front-view images. Then, to reduce false detections, the processor 3 prioritizes filtering out objects that are inherently capable of movement. In some embodiments, the processor 3 first identifies stationary reference objects, such as utility boxes, streetlights, traffic signals, roadside trees, etc. Once one of these objects is detected in the front-view images, an optical flow method or a feature point tracking method can be used to determine whether the vehicle has started moving. The optical flow method analyzes changes in pixel intensity between consecutive front-view images to determine a motion speed and direction of each pixel. By mapping the overall movement pattern of the image, relative motion of objects in the environment can be calculated. If objects in the front appear to move backward in the images, it indicates that the vehicle is moving forward. Conversely, if objects appear to move forward, the vehicle may be reversing. The feature point tracking method selects distinctive feature points (such as corner points) in consecutive front-view images and tracks position changes of the feature points. By analyzing the movement trajectories of the feature points within the front-view images, the direction and the speed of the vehicle can be inferred. In some embodiments where a stereo camera device is used in the front-facing camera module 301, a parallax variation method may be applied to determine whether the vehicle has started moving by analyzing changes in parallax between left and right camera lenses to calculate distances and relative movements of objects ahead. When the vehicle moves, nearby objects exhibit more noticeable parallax changes compared to distant ones. Using this information, a motion status of the vehicle can be determined.

When each time the processor 3 detects a positional change of the road object, it instructs the timer module 5 to continue accumulating the current timing duration and sends the updated value back to the processor 3. Upon determining that the current timing duration exceeds a predefined continuous driving duration threshold (meaning that the driver is in the state of prolonged continuous driving), the processor 3 adopts the second reaction time estimating model M3' that is associated with prolonged continuous driving for reaction time estimation, feeds the estimated age into the second reaction time estimating model M3' to estimate a current reaction time of the driver, and feeds the index representing the identified current road condition into the friction coefficient estimation model M4 to estimate a current friction coefficient of the road where the vehicle is travelling. Otherwise (i.e., the current timing duration does not exceed the predefined continuous driving duration threshold, meaning that the driver is not in the state of prolonged continuous driving), the processor 3 adopts the first reaction time estimating model M3 that is not associated with prolonged continuous driving for reaction time estimation, feeds the estimated age into the first reaction time estimating model M3 to estimate the current reaction time of the driver, and feeds the index representing the identified current road condition into the friction coefficient estimation model M4 to estimate the current friction coefficient of the road where the vehicle is travelling. The processor 3 then inputs the current friction coefficient and current reaction time thus estimated into the risk level evaluation model M5, thereby identifying a current risk level. Finally, the processor 3 retrieves one of the collision time threshold values corresponding to the current risk level from the threshold lookup table (T), and uses the retrieved one of the collision time threshold values as a current collision time threshold.

In this embodiment, determining whether the current timing duration exceeds the predefined continuous driving duration threshold is used to evaluate if the driver is in the state of prolonged continuous driving. If the current timing duration exceeds the continuous driving duration threshold, the driver is considered to be in the state of prolonged continuous driving. In this case, the first reaction time estimating model M3 may be unable to accurately present the adverse effects of prolonged continuous driving on the reaction time of the driver, and the second reaction time estimating model M3' may be a better choice to estimate the reaction time of the driver under the state of prolonged continuous driving. Additionally, when the processor 3 identifies that the position of the road object in the front view has not changed, which indicates that the road object is stationary, the processor 3 may trigger the timer module 5 to further time a stationary duration when the vehicle remains still. The processor 3 then determines whether the stationary duration exceeds a predefined stationary duration threshold. If the stationary duration is determined to be smaller than the stationary duration threshold, the processor 3 causes the timer module 5 to incorporate the stationary duration into the current timing duration and continue to accumulate the current timing duration. If the stationary duration exceeds the stationary duration threshold, the processor 3 causes the timer module 5 to stop accumulating the current timing duration, resets the current timing duration to zero, and restarts the timing when the next driving period begins.

Then, the processor 3 transmits the current collision time threshold to the forward collision warning system 200 through the connection module 4 for the forward collision warning system 200 to determine whether to issue a collision warning. In one example, the forward collision warning system 200 estimates a current distance between the vehicle and a front vehicle, as well as a current speed of the vehicle, based on the front-view image or radar data. The forward collision warning system 200 then calculates a predicted collision time using the current distance and the current speed, and determines whether the predicted collision time is smaller than the current collision time threshold. If the predicted collision time is found to be smaller than the current collision time threshold, the forward collision warning system 200 perceivably issues a collision warning (e.g., a voice notification) to remind the driver of the vehicle.

Although the risk level evaluation model M5 in this embodiment is based on two-dimensional feature parameters (i.e., the friction coefficient and the reaction time), the same logic can be appropriately extended in practical applications to include higher-dimensional feature parameters. For example, additional parameters such as whether the driver is looking at the road ahead, the current line of sight direction, current weather conditions, ambient lighting, and other relevant factors can be incorporated to develop a risk level evaluation model that considers more features and better presents various factors related to the driver and the external driving environment.

To sum up, using the pre-established age estimation model M1, the road condition recognition model M2, the first reaction time estimating model M3, the second reaction time estimating model M3', and the friction coefficient estimation model M4, as well as the developed risk level evaluation model M5, the system 100 can dynamically and adaptively set a collision time threshold that aligns with the reaction capability of the driver and the current road condition based on the front-view image and in-cabin facial image. This allows the forward collision warning system 200 to accurately and effectively determine whether a collision warning should be issued, thereby effectively avoiding the interference or false warnings encountered in conventional technologies.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A forward collision warning method for use by a vehicle that has a computer system, a forward collision warning system, a front-facing camera module and an in-cabin camera module, said method being implemented by the computer system, and comprising steps of:

A) upon obtaining a current front-view image and a current in-cabin image respectively from the front-facing camera module and the in-cabin camera module while the vehicle is travelling, using a road surface condition recognition model that is pre-established in the computer system to identify a current road surface condition based on the current front-view image, and using an age estimation model that is pre-established in the computer system to obtain an estimated age of a driver of the vehicle based on the current in-cabin image;

B) using a risk level evaluation model to determine a current risk level based on a current friction coefficient and a current reaction time, wherein the current friction coefficient is estimated using a friction coefficient estimation model based on the current road surface condition, and the current reaction time is estimated using a reaction time estimation model based on the estimated age of the driver; and C) retrieving a current collision time threshold from a threshold lookup table that is pre-established to record a plurality of different collision time threshold values respectively corresponding to a plurality of risk levels, and providing the current collision time threshold to the forward collision warning system, thereby making the forward collision warning system to perceivably issue a collision waring in response to a predicted collision time being smaller than the current collision time threshold.

2. The forward collision warning method as claimed in claim 1, wherein the risk level evaluation model is established based on a plurality of training datasets, each of which includes a training front-view image and a training in-cabin facial image that correspond to a same time point, said method further comprising, before step A), steps of:

D) for each of the plurality of training datasets, using the road surface condition recognition model to obtain a training road surface condition data piece based on the training front-view image of the training dataset, and using the age estimation model to obtain a training age data piece based on the training in-cabin facial image of the training dataset;

E) for each of the plurality of training datasets, feeding the training road surface condition data piece and the training age data piece obtained in step D) into the friction coefficient estimation model and the reaction time estimation model, thereby obtaining a feature parameter data piece that corresponds to the training dataset, and that includes a training friction coefficient and a training reaction time;

F) using a clustering algorithm to group the feature parameter data pieces that correspond to the plurality of training datasets, thereby obtaining multiple groups of the feature parameter data pieces that respectively correspond to the plurality of risk levels; and G) training an artificial neural network using the feature parameter data pieces that have been grouped, thereby obtaining the risk level evaluation model.

3. The forward collision warning method as claimed in claim 1, further comprising, between step A) and step B), a step of:

H) determining whether a current timing duration exceeds a continuous driving duration threshold, wherein the current timing duration starts from a moment when the computer system detects, based on the current front-view image, a position change of a road object for a first time during a current trip of the vehicle.

4. The forward collision warning method as claimed in claim 3, wherein step B) includes:

upon determining that the current timing duration does not exceed the continuous driving duration threshold, using a first reaction time estimating model as the reaction time estimation model to estimate the current reaction time, wherein the first reaction time estimating model is not associated with prolonged continuous driving; and upon determining that the current timing duration exceeds the continuous driving duration threshold, using a second reaction time estimating model as the reaction time estimation model to estimate the current reaction time, wherein the second reaction time estimating model is associated with the prolonged continuous driving.

5. The forward collision warning method as claimed in claim 3, further comprising steps of:

I) determining whether a stationary duration when the vehicle remains still exceeds a stationary duration threshold;

J) upon determining that the stationary duration does not exceed the stationary duration threshold, incorporating the stationary duration into the current timing duration, and continuing to accumulate the current timing duration; and K) upon determining that the stationary duration exceeds the stationary duration threshold, stopping accumulation of the current timing duration and resetting the current timing duration to zero.

6. A computer system adapted for use with a forward collision warning system of a vehicle to perform forward collision warning, the vehicle having a front-facing camera module and an in-cabin camera module, said computer system comprising:

a storage module storing an age estimation model, a road surface condition recognition model, a reaction time estimation model with age as a feature parameter, a friction coefficient estimation model with a road surface condition as a feature parameter, a threshold lookup table recording a plurality of different collision time threshold values that respectively correspond to a plurality of risk levels, and a risk level evaluation model with a friction coefficient and a reaction time as feature parameters;

a receiver module configured to receive a current front-view image and a current in-cabin image respectively from the front-facing camera module and the in-cabin camera module; and a processor electrically connected to and cooperating with said storage module and said receiver module to configure said computer system to perform the method as claimed in claim 1.

7. The computer system as claimed in claim 6, further comprising:

a connection module to be connected to the forward collision warning system and electrically connected to said processor, wherein said processor is configured to transmit the current collision time threshold to the forward collision warning system for the forward collision warning system to determine whether to issue the collision waring.

8. The computer system as claimed in claim 6, wherein said receiver module is configured to receive a plurality of training datasets, each of which includes a training front-view image and a training in-cabin facial image that correspond to a same time point;

wherein said processor is configured to, for each of the plurality of training datasets, use the road surface condition recognition model to obtain a training road condition data piece based on the training front-view image of the training dataset, and use the age estimation model to obtain a training age data piece based on the training in-cabin facial image of the training dataset;

wherein said processor is configured to, for each of the plurality of training datasets, feed the training road condition data piece and the training age data piece obtained for the training dataset into the friction coefficient estimation model and the reaction time estimation model, thereby obtaining a feature parameter data piece that corresponds to the training dataset, and that includes a training friction coefficient and a training reaction time;

wherein said processor is configured to use a clustering algorithm to group the feature parameter data pieces that correspond to the plurality of training datasets, thereby obtaining multiple groups of the feature parameter data pieces that respectively correspond to the plurality of risk levels; and wherein said processor is configured to train an artificial neural network using the feature parameter data pieces that have been grouped, thereby obtaining the risk level evaluation model, and to store the risk level evaluation model into said storage module.

9. The computer system as claimed in claim 6, further comprising:

a timer module electrically connected to said processor, and configured to start timing a current timing duration since a moment when said processor detects, based on the current front-view image, a position change of a road object for a first time during a current trip of the vehicle, wherein said processor receives the current timing duration, and is configured to determine whether the current timing duration exceeds a continuous driving duration threshold.

10. The computer system as claimed in claim 9, wherein said storage module stores a first reaction time estimating model that is not associated with prolonged continuous driving, and a second reaction time estimating model that is associated with the prolonged continuous driving;

wherein said processor is configured to, upon determining that the current timing duration does not exceed the continuous driving duration threshold, use the first reaction time estimating model as the reaction time estimation model to estimate the current reaction time; and wherein said processor is configured to, upon determining that the current timing duration exceeds the continuous driving duration threshold, use the second reaction time estimating model as the reaction time estimation model to estimate the current reaction time.

11. The computer system as claimed in claim 9, wherein said timer module is further configured to time a stationary duration when the vehicle remains still;

wherein said processor is configured to receive the stationary duration, and to determine whether the stationary duration exceeds a stationary duration threshold;

wherein said processor is configured to, upon determining that the stationary duration does not exceed the stationary duration threshold, incorporate the stationary duration into the current timing duration, and continue to accumulate the current timing duration; and wherein said processor is configured to, upon determining that the stationary duration exceeds the stationary duration threshold, stop accumulation of the current timing duration and reset the current timing duration to zero.

* * * * *